United States Patent
Chow et al.

(10) Patent No.: US 9,185,653 B1
(45) Date of Patent: *Nov. 10, 2015

(54) MEMORY EFFICIENT FILTERING

(71) Applicant: MARVELL INTERNATIONAL LTD., Hamilton (BM)

(72) Inventors: Long Chow, Saratoga, CA (US); James Kang-Wuu Jan, San Jose, CA (US); Robert Lee, Fremont, CA (US); Chen Fan, Cupertino, CA (US); Xiaohua Luo, San Jose, CA (US); Frank Huang, Dublin, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,556

(22) Filed: Mar. 17, 2014

Related U.S. Application Data (63) Continuation of application No. 13/153,122, filed on Jun. 3, 2011, now Pat. No. 8,675,531, which is a continuation of application No. 11/938,722, filed on Nov. 12, 2007, now Pat. No. 7,957,332.

(60) Provisional application No. 60/865,868, filed on Nov. 15, 2006, provisional application No. 60/944,638, filed on Jun. 18, 2007.

(51) Int. Cl.
*G08C 17/00* (2006.01)
*H04W 52/02* (2009.01)

(52) U.S. Cl.
CPC ................. *H04W 52/0229* (2013.01)

(58) Field of Classification Search
USPC ......... 370/311, 338, 352, 389, 328, 310, 342, 370/315, 351; 709/223, 229; 713/323, 320; 455/414.1, 556
See application file for complete search history.

(56) References Cited

U.S. PATENT DOCUMENTS

| | | | |
|---|---|---|---|
| 5,802,305 | A | 9/1998 | McKaughan et al. |
| 7,398,408 | B2 | 7/2008 | Paljug |

(Continued)

OTHER PUBLICATIONS

Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band, IEEE P802.11g/D8.2 (Apr. 2003).

(Continued)

*Primary Examiner* — Chi H Pham
*Assistant Examiner* — Alexander O Boakye (57) ABSTRACT

In a method and apparatus for providing memory efficient filtering of a received broadcast signal, a wireless device assembly compares a filter expression to packet data in the broadcast signal to determine whether the packet data contains a particular bit pattern indicated by the filter expression. The wireless device assembly is able to perform such filtering with an associated host assembly in a sleep mode or with that host in an active mode. If the host assembly is in a sleep mode, and if the packet data contains the particular bit pattern indicated by the filter expression, the wireless device assembly communicates a wakeup signal to the host assembly for changing the host assembly from the sleep mode to an active mode. On the other hand, if the packet data does not contain the particular bit pattern indicated by the filter expression, the wireless device assembly does not communicate the wakeup signal to the host assembly.

23 Claims, 4 Drawing Sheets

(56) References Cited

U.S. PATENT DOCUMENTS

| | | | |
|---|---|---|---|
| 7,688,792 | B2 | 3/2010 | Babbar et al. |
| 7,957,332 | B1 | 6/2011 | Chow et al. |
| 8,245,210 | B2 | 8/2012 | Ng et al. |
| 8,310,969 | B2 | 11/2012 | Tsai |
| 8,675,531 | B1 * | 3/2014 | Chow et al. .................. 370/311 |
| 2011/0007679 | A1 | 1/2011 | Tsai |

OTHER PUBLICATIONS

Information technology—Telecommunications and information exchange between systems—Local and metropolitan area networks—Specific requirements—Part 3 (Section Three): Carrier sense multiple access with collision detection (CSMA/CD) access method and physical layer specifications, IEEE Std 802-3 (2002).

Information technology—Telecommunications and information exchange between systems—Local and metropolitan area networks—Specific requirements—Part 11: Wireless LAN Medium Access Control (MAC) and Physical Layer (PHY) specifications, International Standard, ISO/IEC 8802-11, ANSI/IEEE Std. 802.11 (1999).

Information technology—Telecommunications and information exchange between systems—Local and metropolitan area networks—Specific requirements—Part 3 (Section Two): Carrier sense multiple access with collision detection (CSMA/CD) access method and physical layer specifications, IEEE Std 802-3 (2002).

Information technology—Telecommunications and information exchange between systems—Local and metropolitan area networks—Specific requirements—Part 3: Carrier Sense Multiple Access with Collision Detection (CSMA/CD) access method and physical layer specifications (2002).

Intel Centrino Mobile Technology Wake on Wireless LAN (WoWLAN) Feature, Technical Brief (2006).

Magic Packet Technolgy, White Paper, AMD (1995).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b (1999).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer in the 5 Ghz Band, IEEE Std 802.11a (1999).

TGn Sync Proposal Technical Specification, IEEE P802.11 Wireless LANs, Abstract (2005).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.

IEEE Std 802.11g/D2.8, May 2002 (Supplement to ANSI/IEEE Std 802.11, 1999 Edition) Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, *The Institute of Electrical and Electronics Engineers, Inc.*, May 2002.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11 nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

van Nee, et al. "The 802.11n MIMO-OFDM Standard for Wireless LAN and Beyond," Wireless Personal Communications, vol. 37, pp. 445-453 (Jun. 2006).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Mar. 8, 2002.

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc. Sections 1-5, Dec. 9, 2005.

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation The Institute of Electrical and Electronics Engineers, Inc., May 1, 2002.

IEEE Std 802.3afTM "IEEE Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications, Amendment: Data Terminal Equipment (DTE) Power via Media Dependent Interface (MDI), IEEE Computer Society, The Institute of Electrical and Electronics Engineers, Inc., (Jun. 2003).

* cited by examiner

MEMORY EFFICIENT FILTERING

CROSS-REFERENCE TO RELATED APPLICATION

The application is a continuation of U.S. patent application Ser. No. 13/153,122 (now U.S. Pat. No. 8,675,531), filed Jun. 3, 2011, entitled "Memory Efficient Filtering," which is a continuation of U.S. application Ser. No. 11/938,722 (now U.S. Pat. No. 7,957,332), filed on Nov. 12, 2007, which claims the benefit of U.S. Provisional Application Nos. 60/865,868, filed on Nov. 15, 2006, and 60/944,638, filed on Jun. 18, 2007. All of the applications referenced above are hereby incorporated by reference in their entireties.

FIELD OF TECHNOLOGY

The present disclosure relates generally to communication devices, and more particularly, to techniques for improving filtering of data packets received over a network.

DESCRIPTION OF THE RELATED ART

Wireless networks enjoy increasing popularity as portable computing devices become more prevalent. Many consumers have installed personal wireless networks in their homes that, while limited in range, offer considerable bandwidth access for network devices such as portable computers, wireless gaming machines, and cellular phones. On a larger scale, office complexes, retail businesses, and even cities have begun deploying wireless networks that cover large areas and which allow wireless device access.

There are numerous types of wireless networks and network protocols. Wireless local area networks (WLAN), for example typically include one of the various Institute of Electrical and Electronics Engineers (IEEE) 802.11 standard wireless protocols, first promulgated in 1999. Protocols such as IEEE 802.11a, 802.11b, 802.11n, and 802.11g operate at different spectrum bands and deploy different multiplexing and spread spectrum schemes to deliver data.

These WLAN networks are typically configured into one or two different topologies: ad-hoc topologies or infrastructure topologies. An ad-hoc network (also termed an Independent Basic Service Set—IBSS) is a peer-to-peer network in which devices communicate directly with one another, without the need of a central host. An infrastructure network, on the other hand, uses a host (e.g., a base station or an access point) to route all data between the supported devices. Infrastructure networks allow wireless devices (or, also termed clients or stations) to join and disconnect from the network with greater ease and as such are typically employed in more long-term network environments, whereas ad-hoc networks are generally more short term, as the name implies. Either topology may support any number of devices including laptop computers, handheld computers, printers, storage media, and other network equipment, such as hosts, routers, switches, etc. In some examples, such as with Bluetooth networks, the wireless devices may be handheld communicators like cellular phones or walkie-talkies.

Wireless networks typically rely upon packet data transmission schemes to communicate information between devices and between devices and the base station or access point. An access point may continuously broadcast a data stream across the network, identifying particular packets within that stream as pertaining to a specific network device. The devices may examine the entire data stream, searching for an identifier such as a media access control (MAC) address, which identifies the packet to follow and the particular device intended to receive that packet.

To properly examine the data stream, wireless devices employ various packet-filtering schemes. Wake-up schemes, for example, search for wake-up data in a broadcast data stream. These schemes include those discussed in the Intel Centrino Mobile Technology Wake on Wireless LAN Feature Technical Brief, of 2006. Such schemes may search for two different types of wake-up packet data: Magic Packet and Pattern Byte Matching (PBM) packet. Magic Packet data was originally defined by AMD in 1995 (See, AMD Magic Packet Technology Whitepaper, November, 1995.) and contains 16 contiguous copies of the destination MAC address, where each address wakes only one device at a time. With Pattern Byte Matching, a group of stations is configured with a designated pattern of bytes that act as a packet filter, such that the entire group of stations may be woken up from a single PBM packet.

While packet filtering techniques exist, it is nonetheless desirable to have more efficient techniques for analyzing data streams for wakeup packets, or other packets, and to do so in a manner that is not memory intensive to the point of substantially degrading device operation.

SUMMARY OF THE DISCLOSURE

In accordance with an example, provided is a method for controlling operation of a wireless network device that includes (i) a host assembly, (ii) a wireless device assembly, and (iii) an interface assembly having one or more device interfaces connecting the host assembly and the wireless device assembly. While the host assembly is in a sleep mode, the method includes receiving a broadcast signal at the wireless device assembly, the broadcast signal including packet data. The method further includes receiving a filter expression at the wireless device assembly from the host assembly and determining, at the wireless device assembly, based on the filter expression, whether the packet data contains a particular bit pattern indicated by the filter expression. If the packet data contains the particular bit pattern indicated by the filter expression, the method includes the wireless device assembly communicating a wakeup signal to the host assembly for changing the host assembly from the sleep mode to an active mode. If the packet data does not contain the particular bit pattern indicated by the filter expression, the method includes not communicating the wakeup signal to the host assembly.

In accordance with another example, provided is an apparatus for receiving a packet data broadcast on a wireless network. The apparatus includes a wireless device assembly configured to connect to a device interface assembly to communicate with a host assembly. While the host is in a sleep mode, the wireless device assembly is further configured to, receive a broadcast signal at the wireless device assembly, the broadcast signal including packet data and receive a filter expression from the host assembly. While the host is in a sleep mode, the wireless device assembly is also configured to determine based on the filter expression, whether the packet data contains a particular bit pattern indicated by the filter expression. If the packet data contains the particular bit pattern indicated by the filter expression, the wireless device assembly is configured to communicate a wakeup signal to the host assembly for changing the host assembly from the sleep mode to an active mode. If the packet data does not contain the particular bit pattern indicated by the filter expression, the wireless device assembly is configured not to communicate the wakeup signal to the host assembly.

In yet another example, a wireless device includes a host assembly configured to selectively operate in i) a sleep mode and ii) an active mode, the host assembly including an internal processor configured to process packet data received from a wireless device assembly via an input/output interface. The host assembly also includes the input/output interface, wherein the host assembly is configured to block communication of packet data over the input/output interface when operating in the sleep mode. The wireless device also includes a wireless device assembly connected to the input/output interface, wherein the wireless device is configured to i) receive packet data via a wireless network, ii) determine, based on a filter expression, whether the packet data contains a particular bit pattern indicated by the filter expression, and iii) communicate a wakeup signal through the input/output interface to the host assembly if the packet data contains the particular bit pattern indicated by the filter expression. The host assembly is configured to change, in response to receiving the wakeup signal, from the sleep mode to the active mode, and allow communication of the packet data over the input/output interface.

DETAILED DESCRIPTION

Various techniques are described herein for providing a memory efficient packet filtering, generally termed MEF herein, that uses a scalable grammar to describe a wide range of filter expressions for a WLAN system. The MEF grammar allows memory efficient implementation of a filter matching engine of a wireless device. That filter matching engine may be implemented in an underlying host portion of a device or on the WLAN device assembly that serves as a front end connecting the device to the wireless network.

As discussed in examples below, the MEF engine may filter through broadcast packets without affecting operation of an underlying host assembly. Thus, the MEF engine may search for, among other things, wake-up packets received during a sleep mode of the host assembly. The MEF engine may also operate during a normal operating mode, because the host need not be in a sleep mode for the MEF engine to analyze received packets to determine if they are matched to filters.

For reference and explanation purposes, and not for limitation, the following glossary of terms will be used in this application, with various examples uses to follow.

Figure 1:
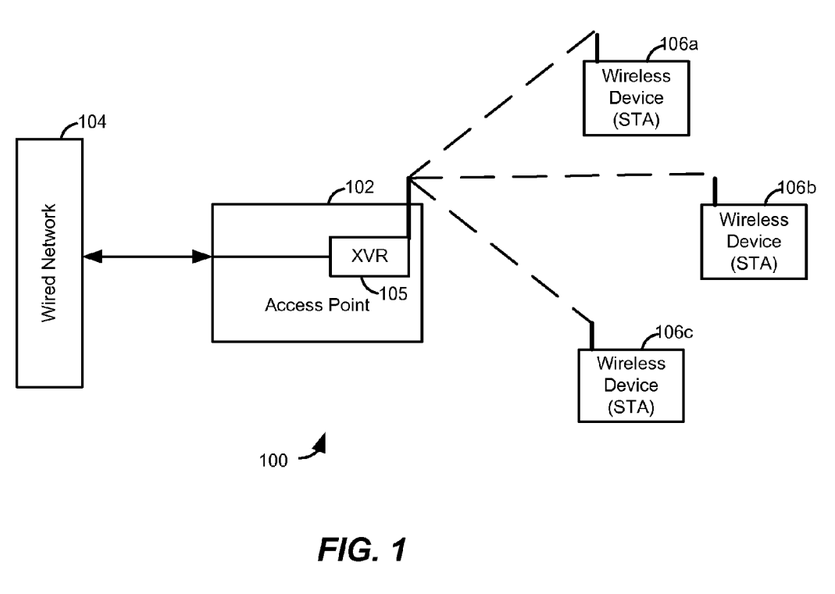
FIG. 1 is a diagram illustrating a wireless network including an access point establishing the wireless network and a plurality of wireless devices associated to the access point.

DA Destination MAC Address
RPN Reverse Polish Notation
rx'd pkt Received packet
ME Memory Efficient
MEF Memory Efficient Filtering
SA Source MAC Address
WLAN Wireless LAN FIG. 1 is a block diagram of an example wireless network 100, which may represent a short range or long range network and which is described herein as being in an infrastructure topology with an Access Point (AP) 102 that represents a computer system, including a dedicated wireless base station, router, or switch. The AP 102 may in other examples represent a wireless network card or other hardware that may be inserted into a computer system, router, base station, etc. In a WLAN environment, the AP 102 (as well as the connected wireless devices) may adhere to one of the accepted or contemplated wireless communications protocols, of which IEEE 802.11a, 802.11b, 802.11g, 802.11n, and Bluetooth, are examples. But these are only provided by way of example. The AP 102 may operate under any desired wireless protocol.

The AP 102 is coupled to an wired network 104, which may contain a series of Internet service providers and is able to transmit and receive data over the Internet. The AP 102 has a transceiver 105 that communicates with numerous wireless devices (or clients or stations) 106A-106C that each may have software (firmware and drivers) and hardware that allow the respective devices to connect to and communicate via the network using the AP 102 as a routing point or access point. By way of example, the wireless devices 106A-106C may represent wireless terminals, personal handheld devices, laptop computers, wireless supported desktop computers, intelligent phones (e.g., GSM based telephones), gaming systems, or other wireless networking devices, such as routers, switches, etc.

As will be discussed further below, the wireless devices 106A-106C may include a host device, or assembly, that performs the primary processing functions, and a wireless device assembly, which may be plug insertable into the host assembly and which communicates wirelessly with the AP 102. Each wireless device 106A-106C may have both sleep (power saving) and active (or normal) operating modes and be able to control entry and exit into these modes based on its own decisional logic. Furthermore, each device 106A-106C may be capable of communicating its operating mode to the AP 102 via status data, which may be transmitted and received on a periodic basis, during an allotted time window, or in an unscheduled manner at the initiation of the wireless device.

In some examples, the AP 102 may be programmed to alter (or suggest a change to) the operating mode of the wireless device 106A-106C by communicating an active mode or power save mode instruction to the wireless device in response to this device status data. Various schemes for power saving in a wireless device will be known. Some examples include slotted power saving mechanisms for IEEE 802.11 compliant devices, wherein a time-slotted bandwidth window is used to wake up wireless devices in particular time slots only. Other examples include intelligent data packeting and buffering that optimizes data transmission efficiency thereby placing wireless devices in an active mode during periods of data transfer, while reducing the amount of time a wireless device spends in an active mode during periods of no data transfer.

The AP 102 is able to communicate information between the wired network 104 and the wireless devices 106A-106C in response to upstream request data initiated by applications executing on the AP 102 or the wireless devices 106A-106C. The applications may represent high-level software running in an operating system environment, examples of which would include web-browsers and electronic mail clients. However, the applications may alternatively represent low-level software code embedded within an operating system or low-level code executing on top of hardware or firmware of the AP 102 or the wireless device 106A-106C.

Figure 2:
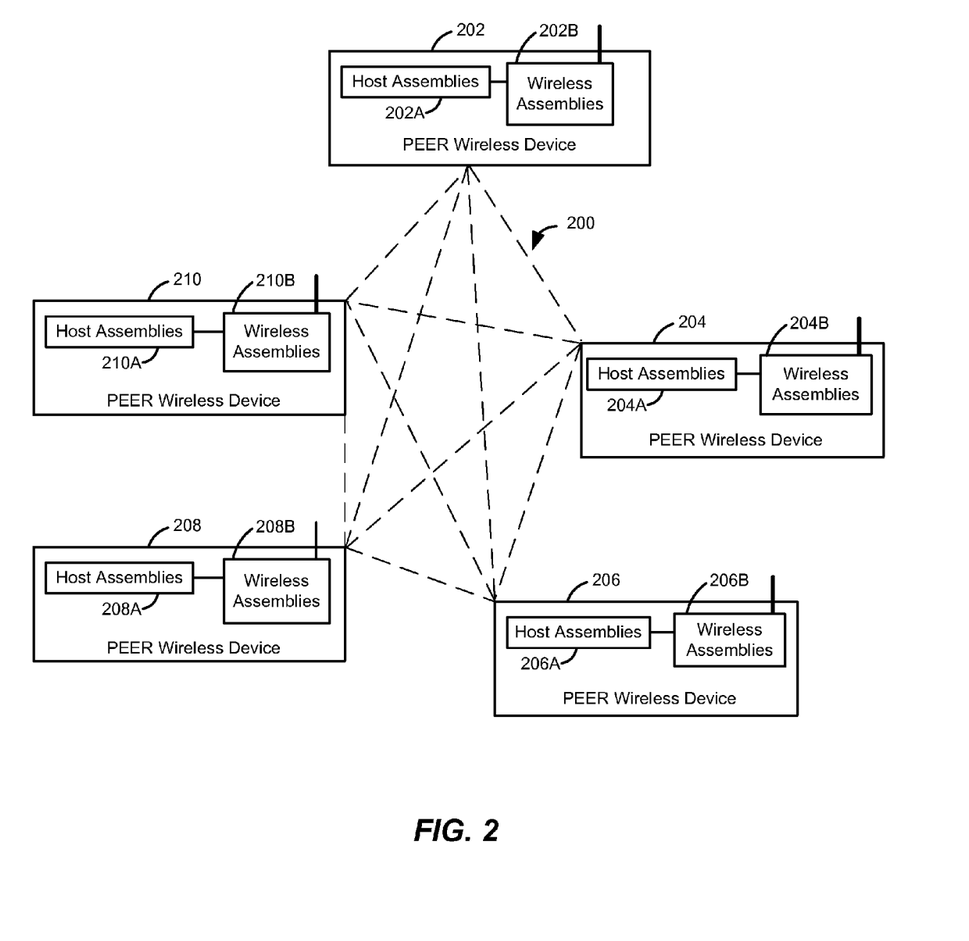
FIG. 2 is a block diagram of a wireless network in an ad-hoc configuration showing various wireless devices capable of communicating directly with one another.

FIG. 2 illustrates an ad-hoc or peer-to-peer network 200 comprising independently communicating devices 202-210 forming the ad-hoc network 200 and capable of communicating directly with one another. The devices 202-210 include host assemblies 202A-210A, respectively, each coupled to a wireless assembly 202B-210B to establish and maintain the ad-hoc network 200. In an ad-hoc topology, each of the clients 202-210 will operate as a separate node capable of communicating data to the other nodes.

Figure 3:
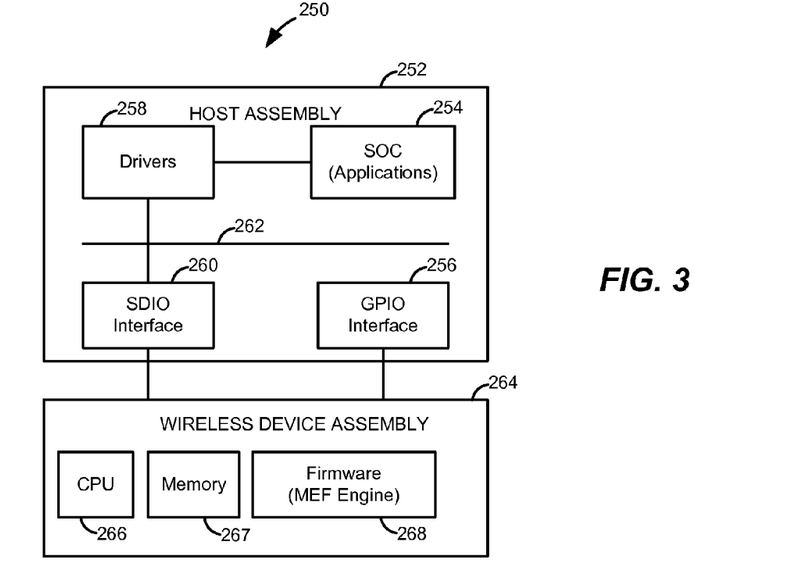
FIG. 3 is a block diagram of a wireless device having a host assembly and a wireless device assembly coupled to the host assembly through an interface.

FIG. 3 illustrates an example implementation of a wireless device 250 that may be used in any of the network configurations of FIG. 1 or 2, for example. The wireless device 250 comprises a host assembly 252 that includes a system on a chip (SoC) assembly 254 that processes packet data received on a wireless network. The SoC assembly 254 may include a SoC processor, memory interface, and memory for buffering received packet data for decoding and analysis. Different types of memories may be used for the memory, including double data rate (DDR) memory, flash memory, etc. The memory interface may be provided as an interface corresponding to the memory (e.g., a DDR memory interface, flash memory interface, etc.).

The host assembly 252 may further include additional components, such as a test action port, e.g., joint task action group (JTAG) port (not shown), an input/output interface (e.g., a general purpose input/output (GPIO) interface 256), or a receiver and/or transmitter, or universal asynchronous receiver/transmitter (UART) (not shown).

The host assembly 252 further includes host drivers 258 that interface with a secure digital input/output (SDIO) interface 260 connected thereto via a SDIO bus 262. The SDIO interface 260 connects the host assembly 252 to a wireless device assembly 264, which may be a WLAN device capable of communicating over a wireless network with an access point, such as a base station, although in other examples the WLAN device assembly 264 may itself serve as an access point. In the illustrated example, the assembly 264 includes a central processor or chipset 266 controlling operation of the assembly 264, a memory 267, and firmware 268 that controls the interfacing and handshaking (to be described further below) between the device assembly 264 and the host assembly 252 and that executes a MEF engine as discussed below.

The host assembly 252 may be in a sleep mode where the host assembly 252 does not communicate with the device assembly 264 or allow the assembly 264 to access the SDIO bus 262. In this mode, however, the device assembly 264 may still receive packet data broadcast from the AP, in an infrastructure network, or another device in a peer-to-peer or ad-hoc network. The device assembly 264 running the MEF engine will receive, analyze, and filter such packet data and assess whether the data is particular to the given network device, and do so without waking the host assembly 252 from the sleep mode. Upon identification of a wakeup packet for the device 250, the device assembly 264 communicates a wakeup signal to the host assembly 252 to allow the device 250 to begin receiving the packet data. The firmware 268, for example, may deliver a wakeup interrupt to the host assembly 252 separately through the GPIO interface 256 or other method to affect wakeup.

To analyze incoming packets, the host driver 258 sends to the firmware 268 an MEF filter expression consisting of a combination of packet filters. The firmware 268 pushes each operand and operator into a stack 270. Generally speaking, upon receipt of each rx'd pkt, the firmware 268 pops an operator and associated operands from the stack, then performs the specified comparison or logical operation, and finally pushes the intermediate results into an active stack portion. The final result of the MEF filter expression executed on a rx'd pkt would be either a match or not a match, from which a specified action would take place, such as ALLOW versus DISCARD or WAKEUP versus not WAKEUP.

Figure 4:
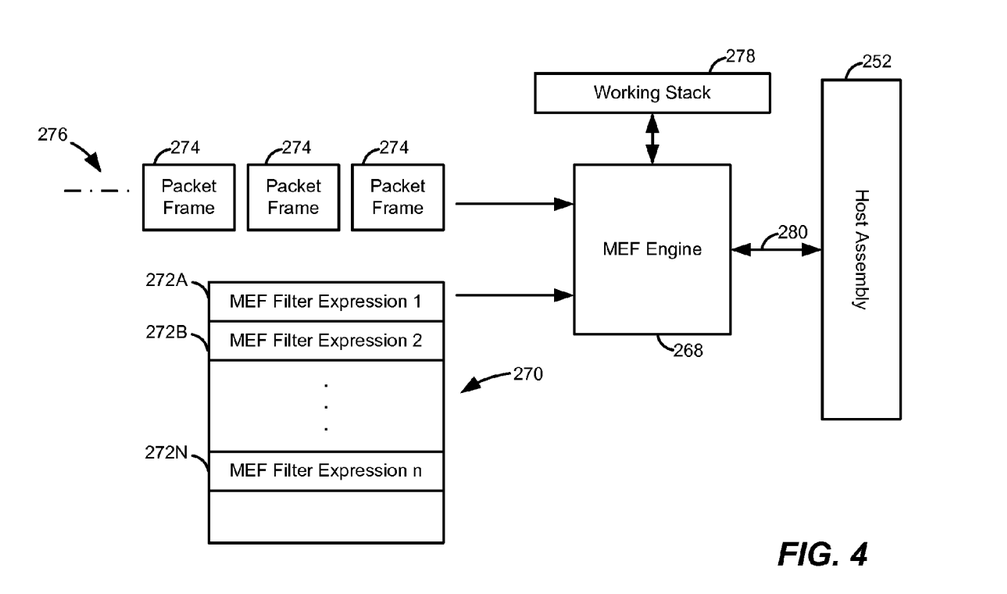
FIG. 4 is a block diagram of a memory efficient filter engine that may be executed by firmware in the wireless device assembly of FIG. 3 and that compares received packet frame data against filter expressions.

FIG. 4 illustrates the memory stack 270 defined by the memory 267 and including multiple MEF filter expressions 272A, 272B and 272N. The MEF engine 268 takes these MEF filter expressions 272 and compares them each to received packet frames 274 in incoming data stream 276 of the memory 267. The result from the MEF engine comparison may be provided to the host assembly 252 in some instances, e.g., upon receipt of a wakeup request in frame 274, in which the frame 274 is communicated by a connection 280 serving as part of a host assembly interface not shown. The intermediate results from the comparisons are stored in a working stack 278 which may also be a portion.

The host driver 258 may perform syntax checks on the MEF filter expression, prior to sending a MEF filter expression to the firmware 268, to test and evaluate the MEF filter expression with a memory having an equal MEF stack size as employed by the firmware 268. In this way, the host driver 258 can ensure against overloading the memory 267. Furthermore, by offloading checks and evaluation tests to the host driver 258, the MEF code in firmware 268 can be leaner and more robust.

The MEF filter expressions may be characterized by operators and operands and may use a grammar set forth by two types of constants: byte sequence constants and decimal numbers. A byte sequence for an operand is a series of bytes represented by a token with its first character being "h" and with each byte in hex format. A ":" character is used as a delimiter between every 2 bytes of this hexadecimal format, for example, h00:50:43:20:01:02. A decimal number sequence for an operand is a constant with its first digit being a 0 through 9 digit, examples of which would be: 16, 6, 4, 23, 40 and 2.

Various operators can be used and combined to form MEF filter expressions. Basic building blocks discussed herein include comparison operators, "=" for a byte comparison, "=d" for a decimal comparison, and "=b" for a bit level comparison. Relational operators "&&" for logic AND and "||" for logic OR are also part of the MEF engine grammar.

Examples below use a particular grammatical format, but the MEF engine is not limited to any particular format. Other suitable formats may be used, including other grammars that result in a minimal memory footprint at the wireless device assembly or host. Further still, the MEF engine can be scaled to have an expanded grammar, e.g., by programming a host with additional grammar rules. Such expandability may be particularly useful as network evolves over time and as devices are ported over to different networks or network topologies.

In some examples, the MEF engine executes packet filter expressions in a RPN, which offers the advantages or minimal notation, implied precedence of clauses, and ease of evaluation. With RPN, the operands of an expression are provided first in sequence and the operand(s) follow. Other notations, such as infix, may be used instead. In infix notation, the operator is 'in' the middle of a clause, between operands, unlike RPN where the operands are indicated first and the operator follows. An example grammar expressed in infix notation is:

10*2, which is a clause with the multiply operator "*" placed between the "10" operand and the "2" operand. Of course other notations may be employed as well. Furthermore, the system may be designed to support multiple different grammar structures, which would allow manufactures to create their own filters in a host assembly or in a wireless device assembly. The devices may support one of multiple grammar structures at a time, or the devices may support multiple grammar structures simultaneously.

As noted generally above, the basic operators of the MEF engine are comparison operators, a byte comparison operator and a decimal comparison operator. Each is capable of taking a MEF filter expression and comparing it to a data in a received packet and then producing a decimal (or binary) number that is 1 (or TRUE) meaning a match has occurred or 0 (or FALSE) meaning that there was no match from performing the comparison of MEF filter expression. The most basic comparison is of a field within a rx'd pkt 274 against a pattern in the MEF filtering expression. Various comparisons may be combined together with logical operators (e.g., AND and OR) to form an MEF filtering expression. Each MEF filter expression, in turn, is housed in a MEF entry, that contains a Mode field, an Action field, and the MEF expression fields, which are provided to the firmware 268 by an MEF configuration command, as discussed below in a MEF_CFG command.

An example byte comparison between a byte sequence constant and a specified field of a rx'd pkt 274 could be expressed in RPN with 3 operands and an == operator, as follows:

<copies> <byte seq> <field byte offset>==.

The <copies> operand indicates the number of desired copies of the byte sequence constant <byte seq>. The <copies> operand may be expressed as a decimal number, with a sample valid range of 1 through 16. The <copies> operand and <byte seq> (byte sequence) operand together form the filter pattern, where the number of bytes in the <byte seq> operand implicitly establishes the length of the byte sequence. The length of the pattern is the product of the copies and length of the byte sequence. The <field byte offset> operand instructs the MEF engine on the byte offset for the incoming data frame 274 so that the desired field in the received frame 274 is compared to the filter pattern. The <field byte offset> may be a decimal number. The result from the byte comparison operator == is 1 (match), or 0 (no match).

Figure 5:
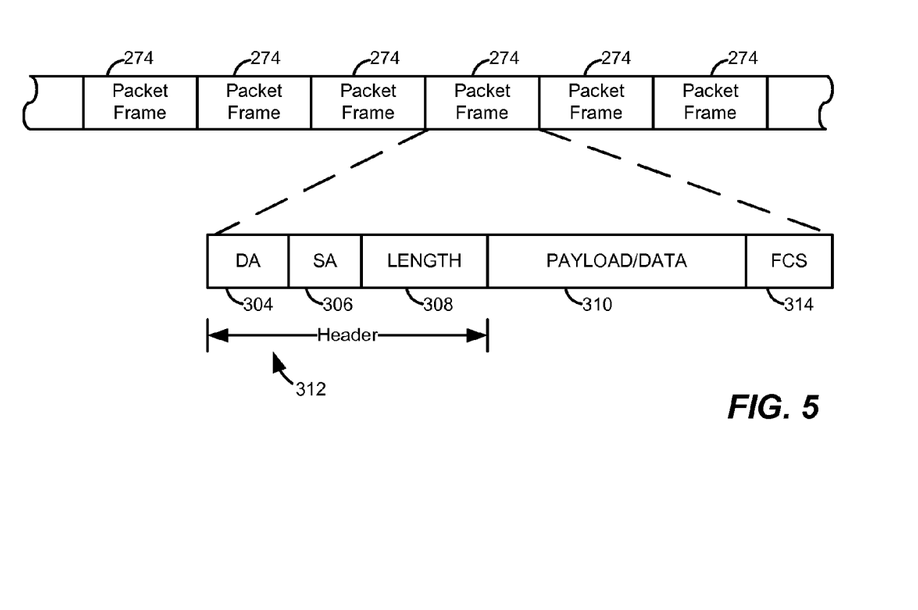
FIG. 5 illustrates an example frame format of the packet frames received by the memory efficient filter engine of FIG. 5.

Take for example, an incoming data stream 276 comprising packet frames 274 as shown in FIG. 5. Each packet frame format received at the wireless device assembly 264 may have a standardized frame format for MAC implementations such as the IEEE 802.3 frame format shown. A destination address is stored at destination address (DA) block 304. The block 304 may consist of 6 bytes and identify the stations that should receive the frame, where the left most bit would identify whether the packet data is a Magic Packet for a single wireless device 250 or whether the packet is a Pattern Byte Matching (PBM) packet that is to be received by multiple wireless devices 250 on the network. A source address (SA) packet 306 may consist of 6 bytes identifying the sending node or wireless device. The length block 308 may consist of 2 bytes and indicates either the number of MAC-client data bytes in the payload block 310 of the frame 274 or the frame type ID from which such information would be known to the wireless device 250. The MEF engine typically performs comparisons between data in the payload block 310 and the expressions of the MEF filter expressions using an offset defined by one of the operands of the expression (e.g. <field byte offset>). The offset may, for example, correspond to the start of the payload block 310, so that the MEF engine may ignore header fields 312. In other examples, MEF filter expressions will require comparing data in the header fields 312 to operands in the expression. The frame 274 further includes a frame check sequence (FCS) block 314 that may consist of 4 bytes and is used for cyclic redundancy check (CRC) values. The format of frame 274 is an example; other optional formats may be used instead or to further extend the protocol. The host device 252 will have knowledge of the payload format (e.g., whether a logical link control (LLC)/subnetwork access protocol (SNAP) is present or not), and responsibility of specifying the proper byte offset value to match the payload data block 310 (or other data block) and instruct the MEF engine accordingly.

An example MEF filter expression of a byte comparison is the following:

16 h00:50:43:20:01:02 14==

16 is the number of copies of the subsequent byte sequence constant that the wireless device assembly 264 will look for in the payload data 310. The next operand h00:50:43:20:01:02 is the byte sequence constant, or pattern, that will be searched for 16 times, with each byte in hex format and with the ":" character as delimiter between 2 bytes. These first two operands together specify the pattern. The next operand 14 is the byte offset (i.e., specifying the desired field starting at the byte after the header field 312). Therefore, the length of the pattern (16×6) and third operand specify the desired field that the wireless device assembly 264 will search and the starting location in the rx'd pkt. The byte comparison operator follows and specifies that there is to be a comparison between the pattern (96-byte sequence) and the payload data 310 of the rx'd pkt. This is an example of a Magic Packet wakeup, in which the filter directs the MEF engine to look for 16 contiguous copies of the destination MAC address in each rx'd pkt for waking up a single wireless device 250.

A bit comparison is similar to a byte comparison in format, but may be used to compare a constant of variable number of bits against the corresponding bits of a field of each packet frame 274. A bit comparison expression may be expressed with 3 operands followed by a=b operator, using the following syntax:

<byte seq> <field byte offset> <mask byte seq>=b.

The <byte seq>, or byte sequence, operand is the byte sequence constant to be compared. The <field byte offset> operand is the byte offset of the desired field in the packet frame 274, and is a decimal number. The <mask byte sequence> is the bit mask. The byte sequence constant, desired field, and mask must be of the same length. The byte sequence constant is compared with the AND result of the desired field at a field byte offset, and mask sequence, to render a result of 1 (match) or 0 (no match).

An example bit comparison MEF filter expression, also in RPN, is one in which the MEF engine analyzes the data stream to determine if the destination MAC address is unicast or not. A unicast packet may be identified by the least significant bit of the first byte of the destination MAC address having a value of 0. An example MEF filter expression would be as follows:

h00 0 h01=b where h00 is the 1-byte sequence constant; 0 is the byte offset of the desired 1-byte field of the packet frame 274; h01 is the 1-byte mask; and =b is the bit comparison operator. In this example, the MEF engine compares 0x00 to the AND result of the first byte and 0x01 mask.

The comparison between a decimal number constant and a specified field of each rx'd pkt may be expressed by 3 operands and a=d operator using the following grammar:

<dec> <field byte offset> <num bytes>=d

The <dec> operand is the decimal number constant, with a valid range of 0 through 2 to the power of the value of the <num bytes> operand minus 1. The <field byte offset> operand is the byte offset of the desired field the MEF engine is to search in the packet frame 274 for comparison to the decimal number. The <num bytes> operand is the number of bytes of the desired field, which may have a valid range of 1, 2 and 4, for example. The MEF expression is a 1 (match), or 0 (no match).

An example decimal comparison, expressed in RPN, would be as follows:

80 44 2=d where 80 is the decimal constant to be compared, 44 is the byte offset for the field (e.g., the payload block 310) in packet frame 274, and "2" is the number of bytes or length of the field to be compared, for example, the first two bytes of the payload data 310. The expression "=d" is the decimal comparison operator. In this example, the MEF engine attempts to identify each packet frame 274 with a TCP destination port 80, which is used in this example because HTTP services use a TCP port 80 as the default.

To form more complex expressions, multiple MEF filter expressions, such as these comparisons, can be combined with an AND or OR operator. An example compound MEF filter expression, in RPN, is one in which the MEF engine matches an address resolution protocol (ARP) packet with a target protocol address. An example for matching with a protocol address of 192.168.0.104 would be as follows:

6 hff 0==
1 h08:06 20==&&
1 hc0:a8:00:68 46==&& # ARP target protocol addr 192.168.0.104

The first expression determines if six copies of the expression hff exist at a byte offset of 0, which would indicate that the destination address (DA) is a broadcast address. The expression is combined, by a logic AND, with the second expression which determines if the hexadecimal expression 0x0806 is found at an byte offset of 20, which corresponds to the EtherType field of the Ethernet frame format and which indicates the type of protocol being used for the frame format. The second expression is applied to identify whether an ARP protocol is being used. The AND combination of the first and second expressions is then compared by an AND to the third expression to create this compound filter expression. The third expression searches for a single copy of the expression equating to the ARP target protocol address 192.168.0.104 at a byte offset of 46. If each of the first, second, and third expressions yields a 1, then the compound MEF filter expression is satisfied and the MEF engine will produce a 1 value. In this example, if any of the expressions yields a 0, i.e., is not true, then the MEF engine will produce a 0 value.

Another example compound MEF filter expression is one in which the MEF engine searches the packet frame 274 for a Magic Packet or a packet for TCP destination port 80 sent by IP address 192.168.0.88, as follows:

16 h00:50:43:20:01:02 14==
80 44 2=d
1 hc0:a8:00:58 34==
&& ||

In this example, the MEF engine executes this compound MEF filter expression by applying the following steps.

1. 16 copies of MAC address 00:50:43:20:01:02 are matched against 96-byte sequence at byte offset 14 of a rx'd pkt.
2. The value 80 is matched with the field at byte offset 44 (and 2-byte long) of the rx'd pkt.
3. 1 copy of byte sequence c0:a8:00:58 is matched with the 4-byte field at byte offset 34 of the rx'd pkt, where the purpose of this comparison is to match Source IP address 192.168.0.88.
4. The use of RPN notation specifies the precedence in each these expressions are to be combined. First the result of step 2 is AND'd with the result of step 3.
5. Then the result of step 1 is OR'd with the result of step 4.

This compound expression is illustrated in an RPN grammar, but MEF grammar in an infix notation (more human friendly) could be supported. Translation code can be augmented in MEF to translate this possible infix notation example:

byte_cmp(16, h00:50:43:20:01:02, 14)||
(dec_cmp(80, 44, 2) && byte_cmp(1, hc0:a8:00:58, 34))

into the RPN notation:

16 h00:50:43:20:01:02 14==
80 44 2=d
1 hc0:a8:00:58 34==
&& ||

In any of these examples, filtering may be performed in the wireless device assembly 264, without affecting the operating state of the host assembly 252, whether that state is a sleep mode or normal operational mode. If the (simple or compound) expression yields a 1 or TRUE value, then a match to the MEF filter expression has been found and the rx'd pkt (e.g., product frame 270) may be passed from the wireless device assembly 264 to the host assembly 252 of the wireless device 250 for processing. If the host assembly 252 is in a sleep mode, the device firmware 268 may first communicate a wakeup interrupt signal to the host assembly 252 to put that assembly 252 into an awake or normal mode, from which the host assembly 252 will open the main wireless interface (e.g. interface 260) to the wireless device assembly 264 and thereby allow the wireless device assembly 264 to communicate the entire received frame 274.

If there is no match, then the wireless device assembly 264 would be able to filter out the frame 274 without waking or otherwise altering the operational state of the host assembly 252.

The MEF engine in the firmware 268 evaluates the Reverse Polish Notation employed by an MEF filter expression through an eval (evaluation) function. This eval function is recursive, and the firmware task that executes the eval function has finite stack space. Therefore, to guard against stack overflow, the MEF engine may impose a nesting limit on the MEF filter expression, where the value of the limit may be set based on the firmware resources.

The operands and operators of an MEF filter expression may take on the grammar format discussed above. For example, a byte sequence may be a series of bytes represented by a token with its first character being "h", and each byte in hex format. The ":" character is used as delimiter between 2 bytes. The valid number of bytes may be set from 1 through 6, so that the Byte sequence is the largest operand. Each recursive call of the eval function stores 3 operands in the function stack. Minimizing operand size would increase the recursion limit, hence making it capable of deeper MEF operator levels. For infrequent cases of large byte sequences multiple byte comparisons with AND operators may be used.

The byte sequence for an operand field should be specified by the traditional network order that of a big endian byte order, in which the lowest address byte of a field is the most significant byte. The exception would be, for example, the byte sequence for fields in an IEEE 802.11 header which is to be in a little endian byte order, except for the CRC field which is in a big endian format. For the big endian byte order, the lowest address byte is transmitted first. Take the example value of 23 (0x0017 in hex format). When it is stored in a 2-byte field, the lowest address byte is 0x00 and the higher address byte is 0x17.

The decimal number, on the other hand, is a constant with its first digit being a 0 through 9 digit. The decimal number is pushed on to the stack as a 32-bit unsigned integer.

To configure MEF filtering based on MEF filter expressions, the host driver 258 may send an MEF configuration command, MEF_CFG, to the firmware 268 and which identifies the number of MEF filtering expressions to be provided and the MEF filtering expressions themselves. The MEF_CFG command may indicate a size, sequence number, result, and criteria for the MEF filter expressions, as well as the MEF filtering expressions themselves. An example MEF_CFG command to be sent from host driver 258 to the firmware 268 would be as follows:

Request:
CmdCode UINT16 CMD_MEF_CFG
Size UINT16 Number of bytes in the command body
SeqNum UINT16 Command sequence number
Result UINT16 Not used. Set to 0
Criteria UINT32 Criteria for frame types that firmware receives in host sleep mode
NumEntries UINT16 Number of MEF entries
0 or more entries of {
Mode UINT8 Mode of receiving packet
Action UINT8 Action on matching filter
ExprSize UINT16 Number of bytes in MEF expression
Expr[ExprSize] UINT8 MEF expression
}
Response:
CmdCode UINT16 CMD_MEF_CFG|0x8000
Size UINT16 Number of bytes in the command body
SeqNum UINT16 Command sequence number as sent by host
Result UINT16 Result code (Set to 0 for success)
Criteria UINT32 same as that in Request
Num Entries UINT16 same as that in Request
0 or more entries of {
Mode UINT8 same as that in Request
Action UINT8 same as that in Request
ExprSize UINT16 same as that in Request
Expr[ExprSize] UINT8 same as that in Request
}

Criteria field is a bitmap specifying the frame types that the firmware 268 may pass through to the host assembly 252 when the host assembly 252 is in a sleep mode. By communicating a Criteria field from the host assembly 252 to the wireless device assembly firmware 268, the wireless device 250 is able to better moderate host assembly wakeup, by keeping primary filtering control at the wireless device assembly 264 and only communicating frames to the host assembly 252 when necessary or desired. In this particular example, the criteria field is not applicable in a non-sleep mode. The Criteria field can take on the following format.

Criteria:
UINT32  Bitmap specifying frame types that firmware receives in host sleep mode.

| Bits | Bit Name | Description |
|---|---|---|
| 7:4 | | Reserved |
| 3 | MULTICAST | Criteria[3] = 1 Multicast frames are received by firmware during host sleep mode. |
| 2 | | Reserved |
| 1 | UNICAST | Criteria[1] = 1 Unicast frames are received by firmware during host sleep mode. |
| 0 | BROADCAST | Criteria[0] = 1 Broadcast frames are received by firmware during host sleep mode. |

While only three criteria formats are illustrated, other ones could be added. Furthermore criteria in combination of particular sleep modes determine the admission of packets.

The NumEntries field identifies the number of activate MEF entries, and whether MEF filter expressions previously provided to the firmware 268 should be deleted from the memory 267. An example format is as follows.

NumEntries:
UINT16 Number of activated MEF entries starting from entry 0.

| Bits | Bit Name | Description |
|---|---|---|
| 15:0 | | NumEntries[15:0]=0 Command firmware to delete all MEF entries specified by a previous MEF_CFG command. Valid range: 0 through 1 (N − 1) |

MEF entries filter expressions follow the Num Entries field. Each MEF entry contains a Mode field and an Action field below. The Mode field is a bitmap field with two enable/disable bits. The first bit is an MEF_DURING_HOSTSLEEP bit that when enabled allows the MEF engine to operate when the host is in a sleep mode. The second bit is an MEF_DURING_NON_HOSTSLEEP bit that when enabled allows the MEF engine to operate when the host is in a non-sleep mode. The Action field specifies the action to take when the MEF engine finds a match in the rx'd pkt. For example, Action[1:0]=11 may specify "Allow and Wake host" upon a filter match, meaning that the rx'd pkt is allowed to flow to the host assembly 264 and the host assembly 264 will be woken up.

Beyond these fields, each MEF entry may also include an Expression size field, ExprSize, that indicates the number of bytes in the MEF filter expression, and the Expression fields. The Expression fields follow grammar as discussed above and can include simple (single operator) or compound (multiple operator) expressions as desired.

An example MEF entry may have the following format:

Mode:
UINT8 Mode of receiving packets

| Bits | Bit Name | Description |
|---|---|---|
| 7:2 | | Reserved |
| 1 | NON_HOSTSLEEP | Mode[1]=1 Perform filtering mode specified in Expr during non-hostsleep mode (e.g. normal, or infra power save). |
| 0 | HOSTSLEEP | Mode[0]=1 Perform filtering mode specified in Expr during host sleep mode. |

-continued

Action:
UINT8 Action to be taken on matching rx'd pkt and filter
| Bits | Bit Name | Description |
|---|---|---|
| 7:2 | | Reserved |
| 1 | ALLOW | On matching rx'd pkt and filter during NON_HOSTSLEEP mode: |
| 0 | WAKE | Action[1]=0 Discard<br>Action[1]=1 Allow<br>Note that default action on non-match is "Allow".<br>On matching rx'd pkt and filter during HOSTSLEEP mode:<br>Action[1:0]=00 Discard and Not Wake host<br>Action[1:0]=01 Discard and Wake host (e.g. Magic Packet)<br>Action[1:0]=10 Invalid<br>Action[1:0]=11 Allow and Wake host<br>Note that default action on non-match is "Discard and Not Wake host". |

ExprSize:
UINT16 Number of bytes in MEF expression
| Bits | Bit Name | Description |
|---|---|---|
| 15:0 | | Valid range: 5 through 100 |

Expr:
UINT8 MEF expression consists of ME filters conforming to the MEF grammar in binary format. The binary format in the stack pop order is:
decimal number:
First pop of 1 byte is TYPE_DNUM
Next pop of 4 bytes is a uint32
byte sequence:
First pop of 1 byte is TYPE_BYTESEQ
Next pop of 1 byte is number of bytes of byte sequence
Next pop of n bytes are byte sequence
== operator (byte comparison):
First pop of 1 byte is TYPE_EQ
=d operator (decimal comparison):
First pop of 1 byte is TYPE_EQ_DNUM
=b operator (bit comparison):
First pop of 1 byte is TYPE_EQ_BIT
&& operator (logical AND):
First pop of 1 byte is TYPE_AND
|| operator:
First pop of 1 byte is TYPE_OR No separators are necessary among operands/operators.

A particular MEF configuration command form the host assembly 252 may communicate numerous MEF entries to the firmware 268. Each MEF entry may contain a single MEF filter expression, and thus be a simple expression, or each may contain multiple MEF filter expressions logically compared and thus be a compound expression. For MEF configuration commands that contain multiple MEF entries, the relationship among the various MEF entries is that of an OR operator, meaning that each MEF entry is executed one after another and the results are OR'd together to determine if a match exists. The order of precedence may be that of the highest entry 0 to the least.

Figure 6:
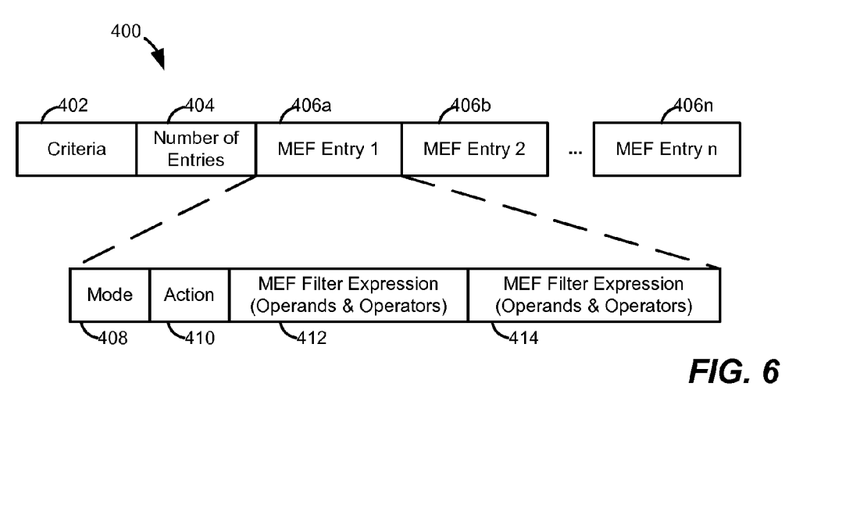
FIG. 6 illustrates a memory efficient filtering configuration data that may be sent from the host assembly of FIG. 3 to the wireless device assembly for communicating the filter expressions illustrated in FIG. 4.

FIG. 6 shows an example MEF configuration command 400, including a criteria field 402 and a number of entries field 404, followed by a plurality of MEF entries 406A-406N. One of these MEF entries 406B is shown in expanded form and includes a mode field 408, an action field 410, MEF filter expression 412, and MEF filter expression 414.

The MEF engine may also perform a verification on the MEF entries (MEF filter expressions) provided to it to determine their accuracy. For example, the host assembly 252 may transmit test packets to the firmware 268 through one of the device interfaces, and after which the MEF engine would apply the filter expressions in the received MEF entries. The host assembly 252 may send a Magic Packet used for Wake On WLAN as a unicast packet with 16 copies of destination address. Alternatively, the host assembly 252 may send a Pattern Byte Matching Packet for Wake On WLAN as a multicast or broadcast packet containing a pattern. The configuration command (MEF_CFG command) previously sent to the firmware 268 will have configured the wireless device 264 to specifically support the internal use of transmitting test packets. Bit 2 of the Mode field may be allocated for this test mode, such that once bit 2 of Mode field is enabled, the definitions of the Action field and the MEF filter expression are changed (or disabled) from that to be used when the wireless device assembly 264 is filtering a rx'd packet instead of a test packet. For example, enabling the bit 2 of the Mode field may disable the Action field and results of the MEF filter expression and establish a default responsive action the assembly 264 is to take in response to a match in the test packet.

An example test mode MEF entry may take the following format:

Mode:
UINT8 Mode of receiving packets and internal use.
| Bits | Bit Name | Description |
|---|---|---|
| 7:3 | | Reserved |
| 2 | TEST mode | Mode[2]=1 Perform testing specified in Action and Expr. Other bits in Mode field are nullified. |
| 1 | NON_HOSTSLEEP mode | Mode[1]=1 Nullified by enabled Test mode. |
| 0 | HOSTSLEEP | Mode[0]=1 Nullified by enabled mode Test mode. |

Action:
UINT8 Action field interpreted as 802.11 Frame Control subtype for Data type test packet to be transmitted.
| Bits | Bit Name | Description |
|---|---|---|
| 7:0 | | Supported subtypes of Data type:<br>Action = 0 Configure transmit data subtype packet<br>Action = 4 Configure transmit null subtype packet<br>Action = 16 Invoke test<br>Only the Action field of MEF entry 0 is used to specify "Invoke test". Subsequent contents of ExprSize and Expr, and subsequent entries are don't care. MEF entries configured by previous MEF_CFG command remain intact. |

ExprSize:
UINT16 Number of bytes in MEF expression
| Bits | Bit Name | Description |
|---|---|---|
| 15:0 | | Valid range: 5 through 100<br>Also must meet the maximum 96-byte payload limit. |

Expr:
UINT8... MEF expression consists of test mode operands employing MEF grammar in binary format.
Operand1 is destination address.
Operand2 is the number of copies of the subsequent byte sequence constant for the formation of pattern in the test packet. Pattern is (copies × byte_sequence).

-continued

> Valid range: 0 through 16
> Operand3 is the byte sequence constant for the formation of pattern.
> Operand4 is the byte offset in 802.3 frame format (i.e. DA, SA, Length and Payload) for the pattern in test packet.

Example test packets could take the following format:
Example of Magic Packet:
Mode[2]=1 Test mode
Action[1]=0 Transmit data subtype packet
ExprSize=? ? bytes of binary format MEF expression below.
Expr h00:50:43:20:5a:82 16 h00:50:43:20:5a:82 14 meaning DA=00:50:43:20:5a:82 (unicast DA), 16 copies of 00:50:43:20:5a:82 starting at byte offset 14.
Example of Pattern Byte Matching Packet:
Mode[2]=1 Test mode
Action[1]=0 Transmit data subtype packet
ExprSize=? ? bytes of binary format MEF expression below.
Expr h01:50:43:20:5a:82 2 hBE:EF 18 meaning DA=01:50:43:20:5a:82 (multicast DA), 2 copies of BE:EF starting at byte offset 18.
Example of Null Packet from an Access Point (AP) Wireless Device:
Mode[2]=1 Test mode
Action[1]=4 Transmit null subtype packet
ExprSize=? 8 bytes of binary format MEF expression below.
Expr h00:50:43:20:5a:82 0 h00 0 meaning DA=00:50:43:20:5a:82 and 0-byte payload.

The MEF engine may support filtering of Wake On WLAN Magic Packet in host sleep mode; Wake On WLAN Personal Broadband Mobile (PBM) Packet in host sleep mode; ARP Request in host sleep mode; and a wide range of received packets in normal mode (i.e., non-host sleep mode).

One example verification of a magic packet waking up a host was performed through an MEF engine executing in a firmware, such as that of firmware 268. In the test, a wireless device node generated a Magic Packet in a unicast frame and transmitted that Magic Packet to another wireless device node, for example in a peer-to-peer network configuration. The host assembly driver on the receiving wireless was configured to print out: "EVENT: HOST SLEEP AWAKE Event!" on receipt of a wake up signal from the wireless device assembly firmware. First, however, a Magic Packet filter for host sleep mode was loaded into the wireless device assembly firmware using a MEF configuration command. The receiving wireless node was a station (STA), such as a mobile or portable device, and received a broadcast signal from an access point (AP), such as a fixed structure, base station, hub, etc. The host assembly used a MEF configuration command as follows (where the expression follows a format as discussed above):
MEF_CFG Command:
Criteria[1]=1 Firmware receives unicast frame in host sleep mode.
NumEntries=1 One MEF entry.
Entry[0].Mode[0]=1 Perform filtering in host sleep mode.
.Action[1:0]=0.01 Discard and Wake host
.Expr="16 h00:50:43:20:5a:82 14=="
The transmitting wireless device, or AP, operated under a MEF configuration command setting up a Test Mode where the device generated and transmitted a Magic Packet in a unicast frame. The MEF filter expression identified the destination address as unicast DA=00:50:43:20:5a:82. The MEF engine was instructed to search for 16 copies of 00:50:43:20:5a:82 starting at byte offset 14 for receipt of a null packet from the receiving wireless device.
MEF_CFG Command:
Criteria[0]=0 Not applicable to Peer's tx operations.
NumEntries=1 One MEF entry.
Entry[0].Mode[2]=1 Test Mode.
.Action=0 Transmit data subtype packet.
.Expr="h00:50:43:20:5a:82 16 h00:50:43:20:5a:82 14"
Thus the verification process included a transmitting device, acting as an AP, and sending a Magic Packet to a receiving device, acting as a STA, and on a unicast frame DA. The AP's beacon indicated the unicast frame in TIM. The STA sends a NULL packet to the AP to request the unicast frame. The AP then resends the Magic Packet as part of the verification process, and the STA displays an EVENT: HOST SLEEP AWAKE Event! indicating that the host assembly of the STA host has been awoken by the firmware of the STA.

Another verification was performed for a pattern byte matching packet waking up the host. A wireless device node, acting as an AP, generated a PBM packet in a multicast frame and transmitted that PBM packet to another wireless device node, acting as an STA, in a peer-to-peer network configuration. The STA operated an MEF configuration command as follows:
MEF_CFG Command:
Criteria[3]=1 Firmware receives multicast frame in host sleep mode.
NumEntries=1 One MEF entry.
Entry[0].Mode[0]=1 Perform filtering in host sleep mode.
.Action[1:0]=01 Discard and Wake host
.Expr="2 hBE:EF 18=="
The transmitting wireless device operated an MEF configuration command as follows, and where a multicast destination address was DA=01:50:43:20:5a:82 (multicast DA), and 2 copies of BE:EF starting at byte offset 18 were searched for:
MEF_CFG Command:
Criteria[0]=0 Not applicable to Peer's tx operations.
NumEntries=1 One MEF entry.
Entry[0].Mode[2]=1 Test Mode.
.Action=0 Transmit data subtype packet.
.Expr="h01:50:43:20:5a:82 2 hBE:EF 18
Thus the verification process included a transmitting device sending a PBM packet from an AP to a STA as DA is multicast frame. Upon receipt and confirmation, the host driver of the STA displays a message, EVENT: HOST SLEEP AWAKE Event!, indicating host has been woken up by firmware.

Similarly, verification was performed on an ARP request waking up the host, where in this test, the ARP Request was a broadcast frame. The receiving wireless device operated as a STA and receives an MEF configuration command as follows, as with an expression formatted as discussed above:
MEF_CFG Command:
Criteria[0]=1 Firmware receives broadcast frame in host sleep mode.
NumEntries=1 One MEF entry.
Entry[0].Mode[0]=1 Perform filtering in host sleep mode.
.Action[1:0]=11 Allow and Wake host
.Expr="6 hff 0==1 h08:06 20==&& 1 hc0:a8:00:68 46==&&"
The transmitting wireless device ran a script that continuously deleted ARP entries to the STA, and continuously pinged the STA to determine the status of the host sleep mode on the STA. The verification process thus included, an AP device sending an ARP request with a DA as a broadcast frame. The same ARP request is forwarded by the AP. An ARP response is then sent from the STA, which acts as a successful ping request followed by ping reply.

The following test was performed on a ARP request discarded in a normal operating mode of a host assembly in a wireless device. In the test, an ARP Request was a broadcast frame, and the wireless device assembly filter was set to discard the ARP Request on matching. For the ARP Request filter, latency times resulted in received packet preparation or 20 μs and an evaluation time of 217 μs, for a total of 237 μs for the wireless device assembly to receive, recognize and discard the ARP Request. The memory footprint was ITCM SQ 1524 216. The MEF configuration command used by the receiving wireless device assembly (STA) to filter the received ARP Request was as follows.

MEF_CFG Command:
Criteria[0]=1 Not applicable for normal mode.
NumEntries=1 One MEF entry.
Entry[0].Mode[1]=1 Perform filtering in non-host sleep mode.
.Action[1]=0 Discard
.Expr="6 hff 0==1 h08:06 20==&& 1 hc0:a8:00:68 46==&&"

The verification process thus included, an AP device sending an ARP Request with a DA as a broadcast frame. The same ARP request was forwarded by the AP. When no ARP Response was received from the STA, the ping requests will have failed to get a ping reply, which was interpreted as the ARP Request being discarded because the STA was operating in a normal mode, not in a host sleep mode.

In other Test Mode implementations, a Null packet may be sent as the test packet in the Test Mode, for example to simulate the periodical unicast of a Null packet from an access point. The wireless devices on the network may save power in such Null packet broadcasting scenarios by identifying the Null packet in the received packet and discarding the Null packet without waking up the wireless device.

Various other modifications may be made as well. For example, a wireless device may be defaulted to a field byte offset that assumes the received packet is in an IEEE 802.3 frame format. However, other frame formats, such as IEEE 802.11, may be supported, for example by adding a modifier to the field byte offset. An example filter matches a modifier (dot11) NULL_DATA or QOS_NULL packets:

h48 d2 hfc=b||
hc8 d2 hfc=b

The operand h48 is the 1-byte sequence constant. C[7:4]= 0100 is a NULL_DATA subtype and C[3:2]=10 is a data type in a 802.11 Frame Control field. The operand d2 illustrates the [d]ot11 modifier for decimal number 2 for extracting the desired 1-byte field at byte offset 2 in an 802.11 header of a received packet. The operand hfc is the 1-byte mask for extracting bits [7:2]. The operator=b is the bit comparison operator, and the operator || is the logical OR operator. The operand hc8 is the 1-byte sequence constant. C[7:4]=1100 is QOS_NULL subtype and C[3:2]=10 is a data type in a 802.11 Frame Control field.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for controlling operation of a wireless network device that includes (i) a host assembly, (ii) a wireless device assembly, and (iii) an interface assembly having one or more device interfaces connecting the host assembly and the wireless device assembly, the method comprising:
receiving a filter expression at the wireless device assembly from the host assembly;
while the host assembly is in a sleep mode,
receiving a broadcast signal at the wireless device assembly, the broadcast signal including packet data,
determining, at the wireless device assembly, based on the filter expression, whether the packet data contains a particular bit pattern indicated by the filter expression,
if the packet data contains the particular bit pattern indicated by the filter expression, the wireless device assembly communicating a wakeup signal to the host assembly for changing the host assembly from the sleep mode to an active mode, and
if the packet data does not contain the particular bit pattern indicated by the filter expression, not communicating the wakeup signal to the host assembly.

2. The method of claim 1, further comprising:
if the packet data contains the particular bit pattern indicated by the filter expression, the wireless device assembly communicating the packet data to the host assembly while the host assembly is in the active mode; and
if the packet data does not contain the particular bit pattern indicated by the filter expression, not communicating the packet data to the host assembly.

3. The method of claim 1, wherein the filter expression includes i) at least a portion of the particular bit pattern and ii) an operator defining a type of comparison for determining whether the packet data contains the particular bit pattern indicated by the filter expression.

4. The method of claim 3, wherein the filter expression further includes i) an offset operand indicating an offset for determining a location within the packet data of a portion of the packet data, ii) a number of copies operand indicating a number of copies of a sub-pattern to be compared to the portion of the packet data, and ii) a length operand indicating a length of the portion of the packet data.

5. The method of claim 3, wherein the filter expression includes a compound filter expression comprising a plurality of sub-expressions, wherein each of the plurality of sub-expressions is combined by a logic AND operator or a logic OR operator.

6. The method of claim 3, wherein the filter expression is a comparison expression for identifying a Magic Packet, a Pattern Byte Matching packet, a MAC address in the packet data as a unicast address, the frame format of the packet data, a TCP destination port for the packet, or a target IP address for the packet.

7. An apparatus for receiving a packet data broadcast on a wireless network, the apparatus comprising:
a wireless device assembly configured to connect to a device interface assembly to communicate with a host assembly, the wireless device assembly further configured to:
receive a filter expression from the host assembly, while the host assembly is in a sleep mode,
receive a broadcast signal at the wireless device assembly, the broadcast signal including packet data,
determine based on the filter expression, whether the packet data contains a particular bit pattern indicated by the filter expression,
if the packet data contains the particular bit pattern indicated by the filter expression, communicate a wakeup signal to the host assembly for changing the host assembly from the sleep mode to an active mode, and
if the packet data does not contain the particular bit pattern indicated by the filter expression, not to communicate the wakeup signal to the host assembly.

8. The apparatus of claim 7, wherein the wireless device assembly is further configured to:
if the packet data contains the particular bit pattern indicated by the filter expression, communicate the packet data to the host assembly while the host assembly is in the active mode; and
if the packet data does not contain the particular bit pattern indicated by the filter expression, not to communicate the packet data to the host assembly.

9. The apparatus of claim 7, wherein the filter expression includes i) at least a portion of the particular bit pattern and ii) an operator defining a type of comparison for determining whether the packet data contains the particular bit pattern indicated by the filter expression.

10. The apparatus of claim 9, wherein the filter expression further includes i) an offset operand indicating an offset for determining a location within the packet data of a portion of the packet data, ii) a number of copies operand indicating a number of copies of a sub-pattern to be compared to the portion of the packet data, and ii) a length operand indicating a length of the portion of the packet data.

11. The apparatus of claim 9, wherein the filter expression includes a compound filter expression comprising a plurality of sub-expressions, wherein each of the plurality of sub-expressions is combined by a logic AND operator or a logic OR operator.

12. The apparatus of claim 9, wherein the filter expression is a comparison expression for identifying a Magic Packet, a Pattern Byte Matching packet, a MAC address in the packet data as a unicast address, the frame format of the packet data, a TCP destination port for the packet, or a target IP address for the packet.

13. The apparatus of claim 9, wherein the wireless device assembly is further configured to:
receive a plurality of filter expressions from the host assembly;
determine based on the plurality of filter expressions, whether the packet data contains a particular bit pattern indicated by at least one of the plurality of filter expressions; and
communicate a wakeup signal to the host assembly if the packet data contains the particular bit pattern indicated by at least one of the plurality of filter expressions.

14. The apparatus of claim 7, further comprising the device interface assembly, wherein the device interface assembly includes a first device interface and a second device interface, wherein the wakeup signal is communicated to the host assembly via the first device interface and wherein the packet data is communicated to the host assembly via the second device interface when the host assembly is in the active mode.

15. The apparatus of claim 14, wherein the host assembly blocks communication from the wireless device assembly through the second device interface when the host assembly operates in the sleep mode.

16. A wireless device comprising:
a host assembly configured to selectively operate in i) a sleep mode and ii) an active mode, the host assembly including
an internal processor configured to process packet data received from a wireless device assembly via an input/output interface, and
the input/output interface, wherein the host assembly is configured to block communication of packet data over the input/output interface when operating in the sleep mode; and
the wireless device assembly connected to the input/output interface, wherein the wireless device assembly is configured to i) receive packet data via a wireless network, ii) determine, based on a filter expression, whether the packet data contains a particular bit pattern indicated by the filter expression, and iii) communicate a wakeup signal through the input/output interface to the host assembly if the packet data contains the particular bit pattern indicated by the filter expression;
wherein the host assembly is configured to change, in response to receiving the wakeup signal, from the sleep mode to the active mode, and allow communication of the packet data over the input/output interface.

17. The wireless device of claim 16, wherein the filter expression includes i) at least a portion of the particular bit pattern and ii) an operator defining a type of comparison for determining whether the packet data contains the particular bit pattern indicated by the filter expression.

18. The wireless device of claim 17, wherein the filter expression further includes i) an offset operand indicating an offset for the packet data for determining a location within the packet data of a portion of the packet data, ii) a number of copies operand indicating a number of copies of a sub-pattern to be compared to the portion of the packet data, and ii) a length operand indicating a length of the portion of the packet data.

19. The wireless device of claim 17, wherein the filter expression includes a compound filter expression comprising a plurality of sub-expressions, wherein each of the plurality of sub-expressions is combined by a logic AND operator or a logic OR operator.

20. The wireless device of claim 17, wherein the filter expression is a comparison expression for identifying a Magic Packet, a Pattern Byte Matching packet, a MAC address in the packet data as a unicast address, the frame format of the packet data, a TCP destination port for the packet, or a target IP address for the packet.

21. The wireless device of claim 16, wherein the host assembly is configured to i) generate the filter expression and ii) evaluate the filter expression using an amount of memory that corresponds to a memory for the wireless device assembly to ensure against overloading the memory for the wireless device assembly.

22. The wireless device of claim 16, wherein the host assembly is further configured to i) transmit a test packet data, ii) receive, from the wireless device assembly, a determination of whether the packet data contains the particular bit pattern indicated by the filter expression and ii) determine whether the determination by the wireless device assembly is accurate.

23. The wireless device of claim 16, wherein the input/output interface comprises i) a secure digital input/output interface for communication of the packet data during the active mode, and ii) a general purpose input/output interface for communication of the wakeup signal during the sleep mode.

* * * * *